(12) United States Patent
Robertson et al.

(10) Patent No.: US 10,791,793 B2
(45) Date of Patent: Oct. 6, 2020

(54) SOLE FOR A SHOE AND METHOD FOR ITS MANUFACTURE

(71) Applicant: adidas AG, Herzogenaurach (DE)

(72) Inventors: Christopher Robertson, Nuremberg (DE); Clemens Paul Dyckmans, Erlangen (DE); Huu Minh Tru Le, Erlangen (DE); Jan Hill, Grossenseebach (DE); Christopher Edward Holmes, Veitsbronn (DE); Giridharan Kirupanantham, Fürth (DE)

(73) Assignee: adidas AG, Herzongenaurach (DE)

( * ) Notice: Subject to any disclaimer, the term of this patent is extended or adjusted under 35 U.S.C. 154(b) by 26 days.

(21) Appl. No.: 15/844,175

(22) Filed: Dec. 15, 2017

(65) Prior Publication Data

US 2018/0168284 A1 Jun. 21, 2018

(30) Foreign Application Priority Data

Dec. 16, 2016 (DE) .................. 10 2016 225 335

(51) Int. Cl.
| | |
|---|---|
| *A43B 13/14* | (2006.01) |
| *A43B 13/04* | (2006.01) |
| *B29D 35/12* | (2010.01) |
| *A43B 13/02* | (2006.01) |
| *A43B 13/12* | (2006.01) |
| *A43B 13/18* | (2006.01) |

(52) U.S. Cl.
CPC ............ *A43B 13/04* (2013.01); *A43B 13/023* (2013.01); *A43B 13/12* (2013.01); *A43B 13/14* (2013.01); *A43B 13/141* (2013.01); *A43B 13/187* (2013.01); *B29D 35/122* (2013.01); *B29D 35/128* (2013.01)

(58) Field of Classification Search
CPC ........... A43B 1/14; A43B 13/00; A43B 13/02; A43B 13/023; A43B 13/026; A43B 13/04; A43B 13/14
USPC .......................................... 36/25 R, 30 R, 31
See application file for complete search history.

(56) References Cited

U.S. PATENT DOCUMENTS

| | | | |
|---|---|---|---|
| 3,608,004 A | 9/1971 | Borisuck et al. | |
| 4,824,720 A | 4/1989 | Malone | |
| 5,433,022 A * | 7/1995 | Lo ........................ | A43B 13/12 264/244 |
| 7,300,612 B2 | 11/2007 | Grinshpun et al. | |
| 7,926,204 B2 * | 4/2011 | Ungari ................. | B29D 35/122 36/25 R |
| 7,951,449 B2 | 5/2011 | Ma et al. | |
| 2005/0132614 A1 * | 6/2005 | Brennan ............... | A43B 13/026 36/73 |

(Continued)

FOREIGN PATENT DOCUMENTS

| | | |
|---|---|---|
| DE | 1 914 484 A | 12/1969 |
| DE | 3 434 907 A1 | 4/1985 |

(Continued)

*Primary Examiner* — Marie D Bays
(74) *Attorney, Agent, or Firm* — Sterne, Kessler, Goldstein & Fox P.L.L.C.

(57) ABSTRACT

A sole for a shoe, such as a sports shoe, includes a plurality of essentially jointly extruded plastic strands. A method for the manufacture of a sole for a shoe includes essentially jointly extruding a plurality of plastic strands and connecting the plurality of extruded plastic strands.

16 Claims, 7 Drawing Sheets

(56) References Cited

U.S. PATENT DOCUMENTS

| | | | | |
|---|---|---|---|---|
| 2009/0094858 A1* | 4/2009 | Ungari | ............... | B29D 35/122 |
| | | | | 36/88 |
| 2013/0059116 A1* | 3/2013 | Peikert | ............... | A43B 7/1255 |
| | | | | 428/138 |
| 2015/0040428 A1* | 2/2015 | Davis | .................. | A43B 13/14 |
| | | | | 36/83 |
| 2015/0196086 A1* | 7/2015 | Riddle | ................. | A43B 7/142 |
| | | | | 36/25 R |

FOREIGN PATENT DOCUMENTS

| | | |
|---|---|---|
| DE | 10 2012 206 094 A1 | 10/2013 |
| DE | 10 2013 202 306 A1 | 8/2014 |
| DE | 10 2015 202 014 A1 | 8/2016 |
| EP | 0 279 668 A2 | 8/1988 |
| EP | 0 921 148 A1 | 6/1999 |
| EP | 0 922 554 B1 | 6/2003 |
| EP | 1 954 466 | 8/2008 |
| EP | 2 649 896 A2 | 10/2013 |
| EP | 2 767 181 A1 | 8/2014 |
| EP | 2 982 491 A1 | 2/2016 |
| EP | 3 053 471 A1 | 8/2016 |
| WO | WO 02/34823 A2 | 5/2002 |
| WO | WO 2007/061571 | 5/2007 |

* cited by examiner

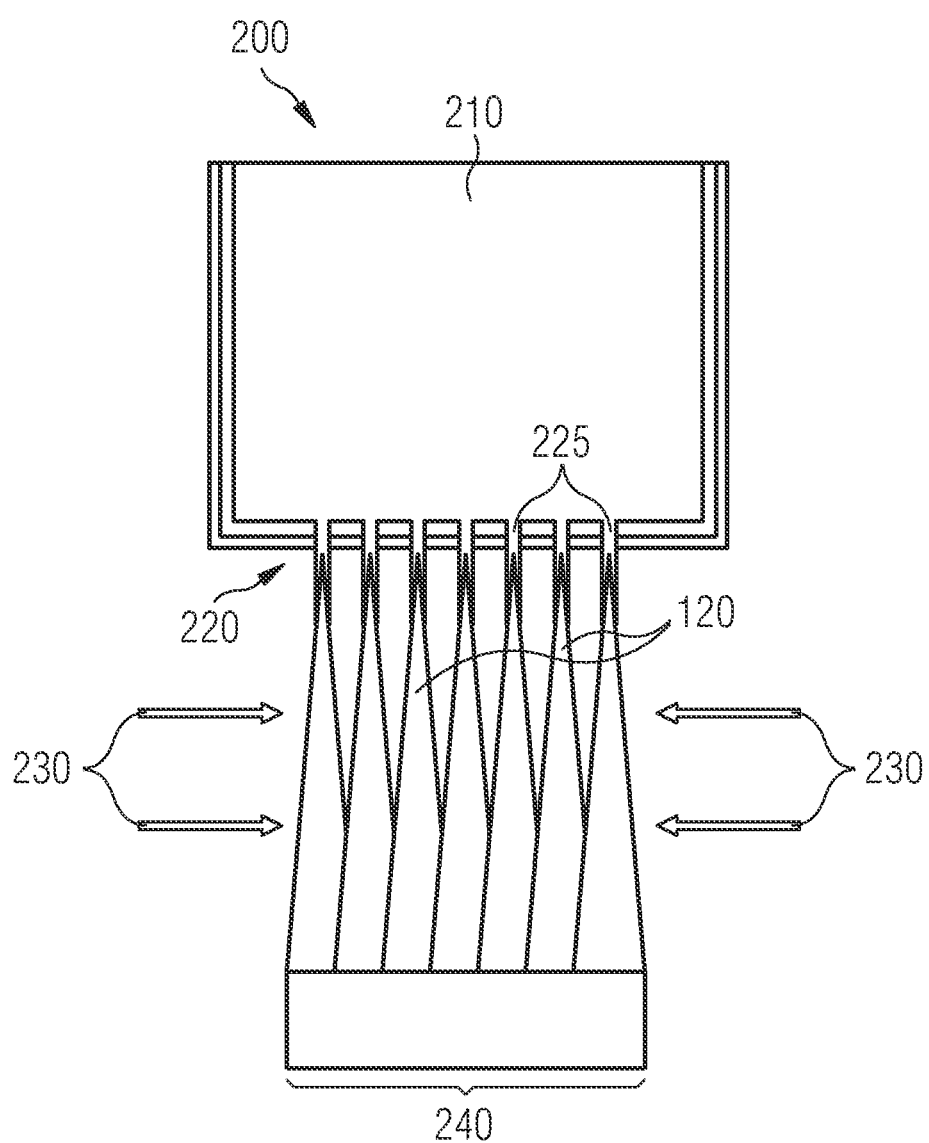

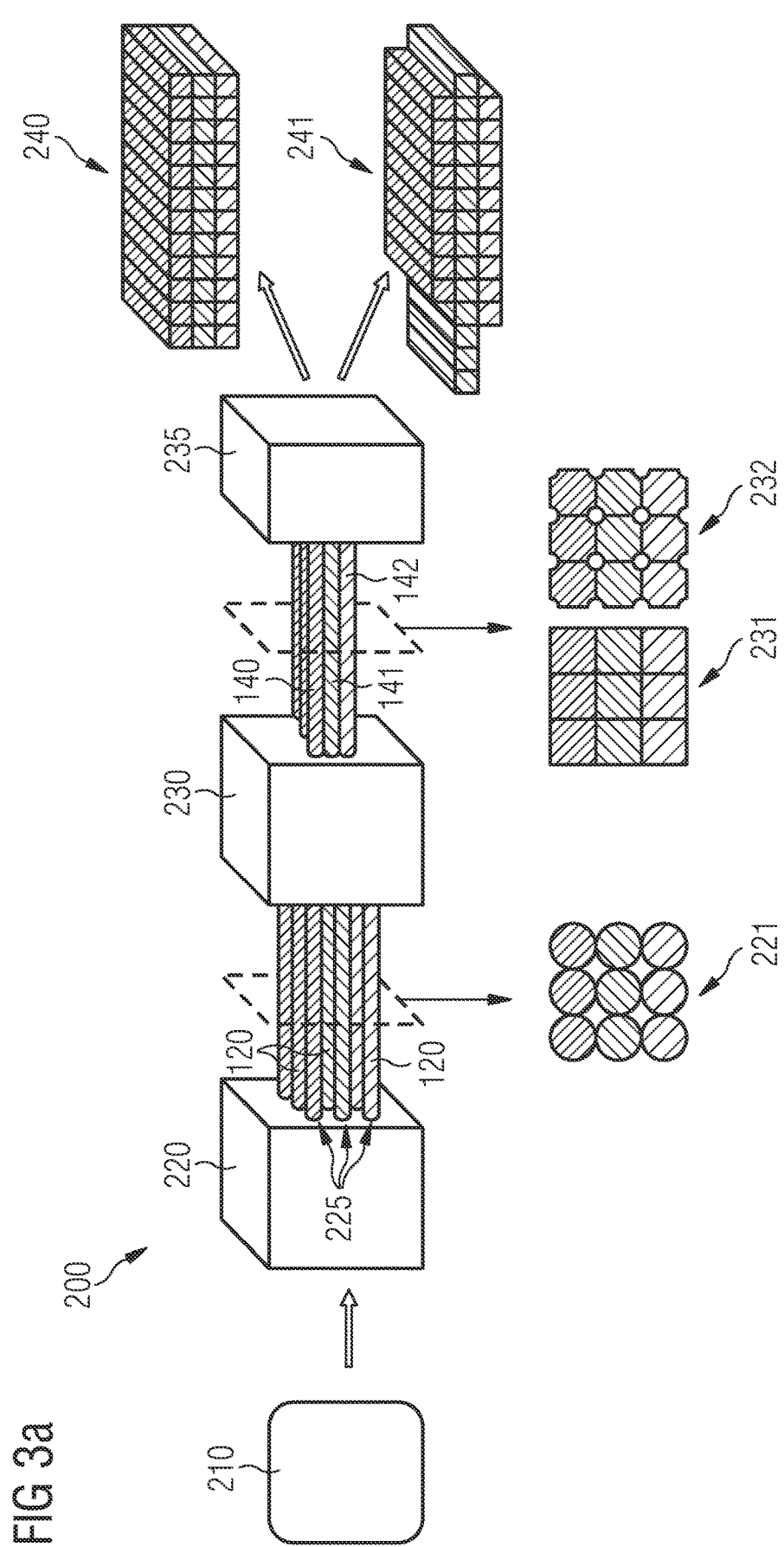

SOLE FOR A SHOE AND METHOD FOR ITS MANUFACTURE

BACKGROUND

Technical Field

The present disclosure relates to a sole for a shoe, in particular a sole for a sports shoe, a shoe with such a sole, a method for the manufacture of a sole for a shoe, and an apparatus for performing such a method.

Background

Shoes, in particular sports shoes like running shoes, generally comprise a shoe sole and a shoe upper.

For one thing, the shoe upper serves the purpose to secure the foot within the shoe and on the sole. Furthermore, a shoe upper can provide additional stability to the foot, for example, to prevent twisting one's ankle when treading on uneven terrain. Also, a shoe upper can protect the foot from external influences like water, dirt, heat, UV-radiation, and so forth. The shoe upper should be provided in a manner to make wearing the shoe pleasing and comfortable for the wearer, including when wearing the shoe for a longer period of time. In addition, pressure points should, if possible, be avoided and good ventilation should be provided for, in particular for the case of sports shoes.

The sole of the shoe acts as protection of the foot against injuries which may, for example, be incurred by treading on pointed or sharp objects. The sole may further cushion the ground reaction forces acting on the musculoskeletal system of the wearer during impact and thus contribute to the prevention of injuries. Furthermore, an abrasion resistant shoe sole may increase the life span of a shoe and increase traction on the ground. The sole should further be able to return at least part of the energy absorbed for cushioning the ground reaction forces back to the foot of the wearer, in order to increase the endurance of the wearer and to increase the efficiency of the gait movement.

In order to meet these demands, different plastic materials are known for the manufacture of shoe soles. For example, documents DE 10 2012 206 094 A1 and EP 2 649 896 A2 describe shoe soles which comprise particles from expanded thermoplastic polyurethane (eTPU) and which comprise good cushioning and energy return properties across a large temperature range.

Beside these demands, it has to also be taken into consideration that during a gait cycle different loads in different directions may act on the sole. For example, loads on the sole in the direction from the heel to the tip of the foot, i.e., in the longitudinal direction of the sole, may significantly differ from loads on the sole in the medial-lateral direction. It may, for example, be desirable for the sole to be flexible in the longitudinal direction in order to facilitate good roll-off of the foot, while in the medial-lateral direction the sole should be comparatively stiff in order to prevent twisting one's ankle.

In order to achieve such anisotropic, i.e., direction-dependent properties of the sole, the use of additional supporting or reinforcing elements for shoe soles is known. For example, documents DE 10 2013 202 306 A1 and EP 2 767 181 A1 describe a shoe sole with a midsole which comprises randomly arranged particles of an expanded material, like eTPU for example. The material of the midsole encompasses an element which, in at least one direction, comprises a larger torsional stiffness than the expanded material of the midsole and may thus serve the purpose of influencing and controlling the properties of the sole in a direction-dependent manner. Such a sole construction may, however, increase the number of individual parts that need to be processed and may thus increase the manufacturing effort. Also, the weight of the sole may significantly increase due to the use of additional supporting or reinforcing elements.

The publications U.S. Pat. No. 4,824,720 A, U.S. Pat. No. 7,300,612 B2, U.S. Pat. No. 7,951,449 B2, EP 0 279 668 A2, EP 0 921 148 A1, EP 0 922 554 B1, EP 1 954 466 A1 and WO 2002/034823 A2, for example, describe different plastic materials and methods for their manufacture which, to a certain degree, comprise direction-dependent properties. For example, document U.S. Pat. No. 7,951,449 B2 describes high-strength, chemically and thermally stable, closed-cell foams which may be used as core materials for composite materials in a sandwich construction, for use in the transport industry or in the construction industry. These core materials display anisotropic properties.

However, the known materials and manufacturing methods are tailored to the fields of application mentioned, for example, the packing industry, transportation, construction or heat isolation, and not to the demands or complex three-dimensional shapes that may be encountered in a shoe sole.

Starting from the aforementioned, it is therefore an objective underlying the present disclosure to provide a shoe sole and a method for its manufacture allowing the properties of the sole to differ depending on direction in order to better account for the different loads occurring during a gait cycle. At the same time, the sole should be easily manufacturable, for example, by keeping the number of individual parts to a minimum. Furthermore, the sole should have as small a weight as possible and comprise good cushioning properties.

BRIEF SUMMARY

These objectives are at least partially solved by a sole for a shoe according to some embodiments. In an embodiment, the sole comprises at least one region which comprises a plurality of essentially jointly extruded plastic strands.

"Essentially jointly extruded" means that the plastic strands are extruded in a single, continuous extrusion process. In other words, it is not the case that several initially separate partial regions are extruded in several extrusion processes which are subsequently joined together to a connected region of the sole in further processing steps. It may, however, be the case that the extrusion of individual plastic strands starts and/or ends earlier or later than the extrusion of other plastic strands of the region of the sole. The extrusion of the plastic strands may hence proceed in a staggered manner. The extrusion of some or even all plastic strands may even temporarily be interrupted, if the extrusion is continued quickly enough so that after finishing the essentially joint extrusion a connected region of the sole is formed.

In general, the essentially jointly extruding may designate that the extrusion of adjacent plastic strands has such a temporal overlap that between two adjacent plastic strands a connection may be created without the use of additional bonding agents or the like. The connection between two adjacent plastic strands may, on the one hand, be created without further assistance, for example if adjacent plastic strands foam or flow into each other after the essentially jointly extruding, i.e., they are passively connected, or, the creation of the connection may be acted upon, for example by means of pressure or heat, i.e., the strands may be actively connected. More detailed explanations on these issues will follow below. All these cases are covered by the expression "essentially jointly extruded".

By jointly extruding the plastic strands, the region of the sole comprising the plastic strands obtains anisotropic properties. This direction-dependence may at least partially result from the fact that a kind of skin has formed at the surfaces of the plastic strands directly after extrusion. This skin may then lead to a change in the properties of the region of the sole compared with, for example, a block extruded in a single piece from the same base material. The region of the sole with the plastic strands may, for example, comprise different properties in the direction of the extruded plastic strands than in a direction perpendicular to the plastic strands. The region may, for example, comprise a higher tensile strength in the direction of the plastic strands than in a direction perpendicular to the plastic strands.

By controlling the process parameters, the degree to which the skin forms at the surfaces of the plastic strands may also be controlled. In this way, the degree of anisotropy of the properties of the region of the sole with the plastic strands may also be controlled and influenced.

The anisotropy created in this way is therefore closely connected with the essentially joint extrusion of the plastic strands and it may, in fact, be difficult or even impossible to adequately describe the created anisotropy in a manner that does not make reference to the essentially joint extrusion.

The region of the sole may further comprise additional materials that may influence and control the properties of the region, in particular the anisotropy of the properties.

It is possible that at least a subset of the plastic strands does not extend in a longitudinal direction of the sole.

Within this document, at least a subset may designate only a single plastic strand as well as all plastic strands, and also all cases there between.

In the longitudinal direction of the sole, i.e., in the direction from the heel to the tip of the foot, the sole should preferably comprise such properties that allow for a natural roll-off of the foot during the gait cycle. It may in particular be possible for the sole to comprise a comparatively low tensile strength in the longitudinal direction, in order not to counteract the natural roll-off movement of the foot. In a different direction, it may, however, also be desirable for the sole to comprise a higher tensile strength and in general a higher stability, in order to protect the foot from unwanted rolling or tilting movements in these directions. This may be achieved by the subset of the plastic strands being aligned in this other direction, i.e., not in the longitudinal direction of the sole. The larger the percentage of the subset within the entire set of plastic strands, the more pronounced the direction-dependent manipulation of the properties of the sole achieved in this manner may be.

The subset of the plastic strands may be aligned essentially perpendicular to the longitudinal direction of the sole.

In particular in the medial-lateral direction, i.e., in a direction from the inside of the foot to the outside of the foot, a high stability and tensile strength of the sole may be desirable, in order to improve performance and safety of the sole through increased stability and, therefore, reduce the potential for injuries, such as twisting an ankle, to occur. Hence, the subset of the plastic strands may, for example, be aligned in this direction.

At least a subset of the plastic strands may comprise a foamed plastic material, in particular foamed ethylene-vinyl-acetate (EVA) and/or foamed thermoplastic polyurethane (TPU) and/or foamed polyamide (PA) and/or other plastic materials suitable for being foamed which are known in the art.

Plastic strands from these materials are well suited for the manufacture of a sole which meets the requirements mentioned in the beginning, due to their good elastic properties.

After extrusion, the extruded plastic strands may be connected to each other by means of pressure.

As previously mentioned, the creation of the connection between the plastic strands may hence be actively made. In this way, for example, the density of the region, the tensile strength, stiffness, or the elasticity of the sole comprising the plastic strands may be influenced and controlled.

After extrusion, the extruded plastic strands may be connected to each other by supplying heat energy, in particular in the form of steam and/or electromagnetic radiation.

By supplying heat energy, the surfaces of the individual extruded plastic strands may be fused to each other, in order to increase the stability and resilience of the region. For example, fusing the surfaces to each other may also have the effect that the density, the stiffness, or the hardness of the region increases. Furthermore, through supplying heat energy it may also be possible to at least partially rehomogenize the surfaces of the plastic strands with the interior of the strands, where, for example, a skin may have formed as mentioned above. In this manner, the degree of anisotropy of the properties of the region may be decreased and adjusted as desired. This may even be done locally to different degrees.

Moreover, the extruded plastic strands may be actively cooled after extrusion.

Actively cooling the plastic strands directly after the extruding may promote the formation of a skin at the surfaces of the individual plastic strands and thus lead to a more pronounced anisotropy in the finished sole. It may also, for example, facilitate the formation of voids between the plastic strands.

The sole may comprise voids between and/or within at least a subset of the plastic strands, wherein the voids extend at least in part essentially parallel to the plastic strands.

In this context, "essentially parallel" may mean that the voids extend in the same direction as the plastic strands, at least as far as this may be influenced and implemented during the manufacture.

Voids within a subset of the plastic strands may, for example, be created by the use of correspondingly shaped dies. Voids between a subset of the plastic strands may, for example, be achieved by extruding the plastic strands with a certain distance between them and subsequently bringing the plastic strands into contact only softly and without application of pressure. In this way, voids may remain between the individual plastic strands, wherein the shape and size of the voids may depend on the shape, in particular the cross-section, of the plastic strands. In general, for example, noticeable voids will remain between plastic strands with round or oval cross-section, whereas smaller or no voids at all will remain between rectangular extruded plastic strands. The pressure potentially applied for joining the plastic strands, a subsequent feeding of heat energy or active cooling of the plastic strands after the extrusion may further influence the shape, size, and/or frequency of the voids.

Such voids may, for example, serve the purpose of saving weight, increasing the breathability, heat isolation of the sole, or influencing the elastic properties of the sole.

The plastic strands may form multiple essentially parallel layers within the sole.

By arranging the plastic strands in several essentially (i.e., as far as this may be implemented during the manufacture) parallel layers, the individual plastic strands may easily be joined together in order to form a resilient and durable compound. In addition, such an arrangement may simplify the manufacture.

At least two of the layers may comprise different properties. For example, the plastic strands in the at least two layers with different properties may differ in a material composition and/or in elasticity and/or in cross-section. Differences in other parameters are also possible. Alternatively or in addition, the properties of the plastic strands may change within a given layer.

Through variation of the material of the plastic strands, variation of the elasticity of the plastic strands, and/or variation of the cross-section of the plastic strands, (between layers and/or within the individual layers), the properties of the sole may be adjusted to the loads and requirements occurring during wear.

The layers may be essentially (i.e., as far as this may be implemented in the manufacture) horizontally arranged within the sole. "Horizontally" may, for example, be defined as parallel to the ground in a situation where a shoe with the sole is resting on the ground without any force being applied to it.

This may provide for the possibility that, for example, on the top side of the sole, i.e., the surface of the sole adjacent to the foot of a wearer, the layers may be provided such that they are particularly soft and cushioning in order to create a pleasant wearing sensation and to beneficially cushion the ground reaction forces during impact. At the bottom side of the sole, i.e., the surface of the sole adjacent to the ground, layers may be provided that are particularly stable in order to prevent injuries and increase durability.

For example, one or more layers at a bottom side of the sole may comprise a non-foamed material.

Such non-foamed materials may be more resilient, tougher, and more abrasion resistant than foamed materials, such that non-foamed materials, for example rubber or the like, may beneficially assume the above-mentioned functionalities at the bottom side of the sole.

The plastic strands may comprise one or more of the following cross-sectional shapes: round, oval, X-shaped, rectangular, quadratic, trapezoid-shaped, parallelogram-shaped, T-shaped, double-T-shaped.

The cross-sectional shape of the plastic strands, which may also differ between individual plastic strands or between subsets of plastic strands, may, for example, be influenced and controlled through a corresponding choice of the design of the tool used for the extruding process, for example, the shape of the extrusion die and/or its orifices.

The cross-sectional shape of the plastic strands (in short: the cross-section) may have an influence on the degree of anisotropy of the properties of the region of the sole with the plastic strands and, for example, the bending stiffness, tensile strength, and elasticity properties of the plastic strands themselves.

The plastic strands may be arranged within the sole in such a manner that the thickness of the sole tapers off towards the tip or toe-end of the sole.

A thickness of the sole tapering off towards the toe-end of the sole may be desirable to enable the tip of the foot to have a higher flexibility in order to facilitate roll-off and a dynamic push-off of the foot over the toes. In the midfoot and, in particular the heel region, on the other hand, a higher thickness of the sole or of the region comprising the plastic strands may be desirable in order to cushion the ground reaction forces occurring during impact in order to protect the musculoskeletal system of the wearer.

The sole may further comprise an outsole and/or a sole reinforcing element, in particular a midfoot support.

Such additional sole reinforcing elements may complement or supplement the manipulation of the properties of the sole by the extruded plastic strands. It may, in particular, be possible to stabilize and support the midfoot region to a high degree, in order to avoid injuries to the arch of the foot. The arch of the foot is a particularly sensitive region of the foot which may be exposed to high loads during running and may therefore quickly show signs of fatigue or irritation which might eventually lead to overload or injury. One such method of stabilizing the arch and avoiding overload or injury is, for example, by the use of a midfoot support.

Furthermore, an outsole may improve traction, in order to allow for faster movements and changes of direction. Also, improved traction may minimize the risk of injury by helping to avoid slippage of the foot. In addition, an abrasion resistant outsole may increase the life span of a shoe with such a sole.

The sole reinforcing element may at least partially be provided as a result of at least a subset of the plastic strands each comprising one or more reinforcing fibers.

For example, during the extruding, metal or textile fibers may be incorporated into the (subset of the) plastic strands, which may, for example, influence the tensile strength or the bending stiffness of the plastic strands. Such reinforced plastic strands may then be arranged in the sole in such a manner that they can reinforce or support the respective sole region as desired.

A further aspect of some embodiments is given by a shoe, in particular a sports shoe, with an embodiment of the sole described above.

For a shoe with such a sole, the optional design features of the shoe soles shown above may be combined with one another in a manner that the desired properties of the sole and the shoe may be achieved.

A further aspect of some embodiments relates to a method for the manufacture of a sole for a shoe, in particular for a sports shoe. In an embodiment, the method comprises the following steps: (a) essentially jointly extruding a plurality of plastic strands, and (b) connecting the plurality of extruded plastic strands.

With regard to the meaning of the term "essentially jointly extruding," reference is made to the corresponding elaborations and explanations regarding the term "essentially jointly extruded" above, which also remain applicable here.

However, once again the fact shall be highlighted that the connecting of the plastic strands after the extruding may on the one hand occur "passively" without further assistance. The plastic strands may, for example, be extruded in close proximity to each other and in vertical direction down from an extrusion apparatus. After exiting the extrusion apparatus, the extruded plastic strands may then further expand and partially foam or flow into one another and in this manner the connecting of the plastic strands may be achieved. In this way, a particularly low-weight sole may be manufactured. Alternatively or additionally, the plastic strands may be extruded horizontally and subsequently connected to one another through the effect of gravity.

However, the connecting of the plastic strands may also occur "actively," for example, through the application of pressure and/or through welding of the plastic strands by the supply of heat energy. Furthermore, the plastic strands may be cooled down before and/or during connecting of the plastic strands.

The extruded and connected plastic strands may form the entire sole or they may only form a partial region of the sole. Hence, the sole may also comprise further additional materials and/or parts.

Further possible embodiments of the method are described in the dependent claims. Insofar as the possible embodiments of the method are reflected in corresponding properties of a sole manufactured with the method, reference is made to the explanations regarding a sole above, which also remain applicable here.

The extruding may, for example, be performed through at least one die with a plurality of orifices.

By a suitable choice of the number of orifices, their size and shape, the distance between the individual orifices, and so forth, the properties of the exudate and hence of the manufactured sole may be influenced.

At least a subset of the plastic strands may comprise a foamed material, in particular foamed ethylene-vinyl-acetate (EVA) and/or foamed thermoplastic polyurethane (TPU) and/or foamed polyamide (PA) and/or other plastic materials suitable for being foamed which are known in the art, after the extruding.

These materials are suitable for being processed in an extrusion apparatus. For example, these materials are suitable for being intermixed with one or more blowing agents that may lead to a foaming of the material after exiting the extrusion apparatus.

The connecting of the plastic strands may be performed, at least partially, by means of pressure.

The extruded plastic strands may, for example, be guided through a kind of funnel or the like which compresses the plastic strands under the application of pressure and hence leads to a more compact final product with, for example, a higher stiffness and lower elasticity.

The connecting of the plastic strands may comprise supplying heat energy, in particular, in the form of steam and/or electromagnetic radiation.

By supplying heat energy, a further foaming or expanding of the extruded plastic strands may be effected, for example, such that the extruded plastic strands flow or foam into each other whereby a close connection of the plastic strands may be achieved. Further possible effects of the feeding of heat energy have already been discussed above.

The connecting may furthermore comprise a cooling of the plastic strands. In this context, it is also possible that only a subset of the plastic strands are cooled in order to selectively influence their properties. The possible effects of cooling the plastic strands have already been discussed.

The connecting of the plastic strands may be performed in such a manner that after the connecting, voids are present between and/or within at least a subset of the plastic strands, wherein the voids may extend at least in part essentially parallel to the plastic strands.

In this context, essentially parallel may again mean as far as the parallelism may be implemented during the manufacture.

Voids within individual plastic strands may, for example, be created by correspondingly shaped dies of the extrusion apparatus for the extrusion of the respective plastic strands. Suitable die shapes are known to the skilled person. For example, some or all plastic strands may be manufactured in a tube-like shape.

The creation of voids between some or all plastic strands has previously been discussed. The same is true for the influence of the chosen process parameters on the voids.

The plastic strands may be extruded and connected in such a manner that they form multiple essentially parallel layers within the sole, wherein the layers may preferably be arranged essentially horizontally within the sole.

This may, for example, be achieved with an extrusion die comprising several rows of orifices arranged in parallel through which the plastic strands are extruded. The rows of orifices may be arranged in the extrusion die in such a manner that the parallel layers are arranged horizontally in the finished sole.

At least two of the layers may comprise different properties.

The plastic strands in the at least two layers may, for example, differ in material composition and/or elasticity and/or cross-section. Differences in other parameters are also possible. Alternatively or in addition, the properties of the plastic strands may also change within a given layer.

Such differences may be achieved, for example, by the extrusion apparatus comprising a die with a plurality of orifices, as mentioned above, with the orifices comprising different cross-sectional shapes. Also, different base material may be fed to the different orifices and extruded through the orifices. By such variation of the cross-sectional shape of the extrusion orifices and the material fed to them, the elasticity of the extruded plastic strands may then be influenced.

After the extruding and connecting, one or more layers at a bottom side of the sole may comprise a non-foamed material.

The non-foamed material may be a material free from blowing agents. For example, rubber or thermoplastic polyurethane without blowing agent may be considered. It is possible that such materials do not foam or expand, or only to a comparatively small degree, after the extruding. Hence, plastic strands from such non-foamed materials may, for example, comprise a higher density and strength than plastic strands from foamed material and this may also lead to higher traction.

After the extruding and connecting, the resultant sole may comprise a material that can be melted for further processing steps. Alternatively or additionally, a further material may be added to the sole to enable a further melting processing step to be enabled.

This may allow at least partially melting the one or more layers at the top side of the sole and the material of a shoe upper with similar melting temperature in an area intended for connection with the sole. After joining the sole and the upper and cooling and solidifying of the involved materials, a durable connection can have formed. Reference is made to the patent applications DE 10 2015 202 014 A1 and EP 3 053 471 A1, in which methods are described that may be applied to and combined with aspects and embodiments of the present disclosure.

The orifices of the die may comprise one or more of the following geometries: round, oval, X-shaped, rectangular, quadratic, trapezoid-shaped, parallelogram-shaped, T-shaped, double-T-shaped.

The geometries may have a direct influence on the cross-sectional shape of the plastic strands extruded through the orifices. It may hence be possible in a constructively simple manner to take influence on the properties of the manufactured sole like, e.g., its elasticity, tensile strength, or bending stiffness through a suitable choice of the geometries of the orifices of the extrusion die.

All or a subset of the orifices of the die may be closed and/or opened before and/or during the method.

By the opening and closing of individual orifices of the die, the three-dimensional shape of the manufactured sole may be influenced. By temporarily closing orifices of the die, it may also be possible to create cavities within the sole because temporarily closing orifices may have the effect that at the corresponding locations a plastic strand "is missing". As a simple example, it may be possible that in the beginning of the extruding all orifices are opened, then for a short period of time some of the orifices in the middle of the die are closed, and in the end all orifices are opened again. In the region of the sole corresponding to the temporarily closed orifices a cavity within the interior of the sole may be located, because parts of respective plastic strands are missing there.

For example, the subset of orifices of the die, which are closed before and/or during the method, may be chosen in such a way that the thickness of the manufactured sole tapers off towards the tip or toe-end of the foot.

The closing of some of the orifices of the die may also serve the purpose of producing a three-dimensional shape of the sole or to at least roughly predetermining it. This may have the effect that a subsequent cutting of the sole may be avoided or facilitated, and waste and defective goods may be saved.

The method may further comprise the step of cutting of the sole.

Such cutting may, for example, be required to provide the sole with its final three-dimensional shape. Whilst the three-dimensional shape may already be roughly predetermined by the opening and/or closing of individual orifices of the extrusion die, cutting may still be necessary due to the size and number of available orifices, which may not be sufficient to obtain the required three-dimensional shape without a further cutting step. The cutting may, for example, comprise cutting with at least one laser. The cutting may also comprise the use of a cutting die.

The cutting may, in any case, allow processing the three-dimensional shape of the sole with more precision.

The method may also comprise the step of shaping of the sole in a molding tool, which may further comprise application of pressure and/or supplying heat.

Alternatively, or in addition to cutting the sole, the sole may also be further processed in a molding tool and be influenced in its three-dimensional shape. To this end, the sole may, for example, be pressed into a molding tool provided as a negative, or the molding tool may comprise two movable partial regions which may be moved towards each other and apart from each other and into which the sole may be mounted for processing. In order to facilitate a change of shape of the sole within the molding tool, heat may further be supplied in order to partially melt the sole for the processing, or at least soften it. The supply of heat may, however, also serve the purpose of directly processing the surface of the sole, for example, by melting individual regions of the surface to alter the surface properties, for example, to make the surface stiffer and/or harder.

During extrusion, the orifices of the die may be arranged above a mold which essentially corresponds to the shape of the sole.

It is hence also possible that the sole is directly extruded into the mold. In this way, on the one hand junk and material waste may be saved. On the other hand, transporting the sole and, e.g., mounting it into a molding tool as described above can be avoided. This may significantly simplify the manufacture and facilitate automatization. Of course, also a sole directly extruded into the mold may additionally be cut and/or be further processed in a molding tool.

During extrusion, the orifices of the die may be moved above the mold.

For example, the orifices of the die may be moved back and forth above the mold during extrusion. In this way, the extruded plastic strands may fill the mold parallel to each other from the bottom to the top. Such an extruded plastic strand may then, for example, form several meanders lying on top of each other within the mold. Or, the extruding of the plastic strands is shortly interrupted when a corresponding orifice of the extrusion die has reached an edge of the mold. The extruding may then immediately be continued after a change of direction of the movement of the die, such that the sections created through such an orifice of the die may each be connected to a single individual extruded plastic strand.

The orifices of the die may be arranged in one or more sidewalls of the mold.

Alternatively or in addition to extrusion, for example, from above the mold, the plastic strands may also be directly extruded or injected into the mold through orifices in the sidewalls of the mold. This may help to reduce the space taken up by the manufacturing apparatus. Also, the number, size and arrangement of the orifices of the dies may be directly adjusted to the respective mold, such that a beneficial result and a beneficial fine-tuning of the desired properties may be achievable.

Prior to extrusion of the plastic strands, one or more first elements, in particular an outsole and/or a sole reinforcing element, may be placed and/or injected into the mold.

The at least one first element may, for example, be a three-dimensional element as described in documents DE 10 2013 202 306 A1 and EP 2 767 181 A1. Plastic strands may flow around this element and secure it within the sole after solidifying. On the other hand, it is also possible that the at least one first element is itself manufactured by extrusion or injection, for example, in an injection molding process. This may happen in a separate injection mold. Alternatively, this may happen in the mold into which the plastic strands are extruded.

The method may further comprise adding one or more second elements, in particular a shoe upper.

The at least one second element may, for example, be welded or glued to the sole. However, it is also possible that the at least one second element is already connected to the plastic strands during the extruding and connecting steps and hence is also connected to the sole. This may save glue or the like and further processing steps.

The second element may be pressed onto the extruded plastic strands under pressure after the extruding step and hence contribute to the connecting of the plastic strands.

This may be particularly beneficial because in a single step a good connection of the plastic strands among each other, and also a good connection of the second element with the plastic strands and hence with the sole, may be achieved.

A further aspect of some embodiments is given by an apparatus for performing an embodiment of the method described above.

The apparatus may be designed in such a manner that it comprises the facility to enable or disable optional method steps as described above if desired and hence allows adjusting the manufactured sole to the wishes and demands. In addition, the apparatus may be automated, or at least predominantly automated, thus improving efficiency and reducing labor costs.

The apparatus may, for example, comprise a mold with a plurality of orifices in one or more sidewalls for extruding a plurality of plastic strands.

The particular benefits brought about by directly extruding or injecting the plastic strands into the mold have already been discussed above.

In summary, some embodiments allow providing soles for shoes that comprise anisotropic, i.e., direction-dependent, and locally controllable properties and at the same time have the cushioning and elasticity properties that are desirable for a sole of the shoe. In addition, the soles may have a low weight and can be easily manufactured and at low costs.

BRIEF DESCRIPTION OF THE FIGURES

Possible embodiments are further described in the following detailed description with reference to the following figures:

FIG. 2 shows a manufacturing method, according to some embodiments;

FIGS. 3a-c show a manufacturing method, according to some embodiments;

DETAILED DESCRIPTION

Figure 1A:
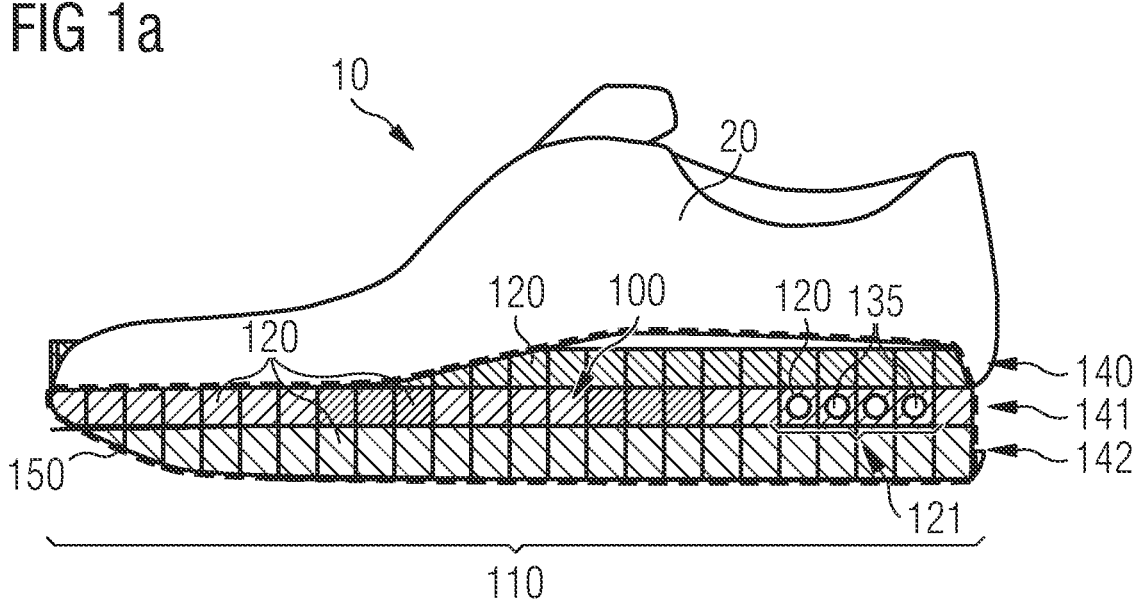
FIGS. 1a-h show a shoe and soles, according to some embodiments.

Possible embodiments will be described in the following detailed description primarily with reference to soles for sports shoes. However, it is emphasized that the present disclosure is not limited to these embodiments. Rather, some embodiments can also be employed with soles for other kinds of shoes and even more generally for cushioning elements in sports apparel.

Furthermore, reference is made to the fact that in the following, only individual embodiments are described in more detail. The skilled person will understand that the design options described in relation to these embodiments may also be modified or combined with one another in a different manner within the scope of the present disclosure and that individual features may also be omitted. In order to avoid redundancies, reference is therefore made to the explanations in the preceding sections, which also apply to the following detailed description.

FIGS. 1a-h show an embodiment of a shoe 10 as well as possible embodiments of a sole 100. The shoe 10 comprises a shoe upper 20. Furthermore, the shoe 10 comprises an embodiment of a sole 100. In the present case, the shoe 10 is a sports shoe, for example a running shoe. Again, reference is made to the fact that some embodiments may also be employed in other kinds of shoes. Reference is further made to the fact that the shown illustrations are merely schematic illustrations, and the dimensions shown in the illustrations do not necessarily match the dimensions that may be encountered in some embodiments.

The sole 100 comprises a region 110 which comprises a plurality of essentially jointly extruded plastic strands 120. The meaning of the term "essentially jointly extruded" has already been elaborated on above. In the present case, the region 110 encompasses the entire sole 100. It is, however, also possible that the region 110 only constitutes a partial region of the sole 100. The sole 100 may then comprise further expanded or non-expanded materials. The sole 100 may also comprise multiple separate regions 110 with essentially jointly extruded plastic strands 120. The sole 100 may further comprise additional elements like, for example, an outsole or a sole reinforcing element (for example, a midfoot support), which are, however, not shown here for simplicity.

The plastic strands 120 may, for example, have been actively connected to one another after extrusion by the application of pressure. In some embodiments, plastic strands 120 may have been connected by supplying heat energy, for example, in the form of steam and/or electromagnetic radiation. In some embodiments, plastic strands 120 may have been cooled down, which may have facilitated the forming of a skin at the surfaces of the plastic strands 120. The plastic strands 120 may have been connected passively without further assistance after extrusion. This issue will be further elaborated on in the context of the discussion of embodiments of a manufacturing method further below.

A subset of the plastic strands 120, in the present case all plastic strands 120, do not extend in a longitudinal direction (i.e., in a direction from the heel to the tip of the foot) of the sole 100. Rather, the plastic strands 120 are aligned essentially, i.e., as far as this may be implemented during the manufacture, perpendicular to the longitudinal direction of the sole 100. The plastic strands 120 thus extend essentially from the medial side of the sole 100 to the lateral side.

Furthermore, the plastic strands 120 form multiple essentially parallel layers 140, 141, and 142 within the sole 100. For clarification, only three such layers 140, 141, and 142 are shown in FIGS. 1a-h. However, the skilled person will also realize that any other number of essentially parallel layers may be considered. Thus, there may also, for example, be 2, 4, 5 or 10 layers, and so forth. The layers 140, 141, and 142 are arranged essentially horizontal within the sole 100.

At least some of the layers 140, 141, and 142 may comprise different properties. For example, the plastic strands 120 in the layers 140, 141, 142 may differ in their elasticity or cross-sectional shape. Alternatively or additionally, the layers 140, 141, 142 may be comprised of different materials or material mixtures, for example, the plastic strands 120 in the layer 140 may be different from the plastic strands 120 in the layer 141 and/or the layer 142. It will be apparent to the person skilled in the art that other combinations are possible.

Additionally or alternatively, it is also possible that the material of the plastic strands 120, the elasticity of the plastic strands 120 and/or the cross-section of the plastic strands 120 differs within a layer itself, for example, within layer 140.

Specifically, in the embodiments of sole 100 shown in FIGS. 1a-h, the different layers 140, 141, and 142 first of all differ in the material of the respective plastic strands 120. However, as already mentioned this is merely an option and need not be the case with all embodiments.

For example, the layer 142 at the bottom side of the sole 100 may comprise a non-foamed material. This material may, for example, be a rubber or non-foamed thermoplastic polyurethane and thus act as an outsole. Alternatively or additionally, multiple layers at the bottom side of the sole 100 may comprise such a non-foamed material.

The layer 140 at the top side of the sole 100 (or also multiple layers at the top side of the sole 100), on the other side, may comprise a material with a melting temperature in a suitable processing range. Such a material may be particularly well suited to connecting the sole 100 with the shoe upper 20, for example, by welding, as previously mentioned.

The layer 140 at the top side of the sole 100 may, in particular, also comprise a foamed material, in order to cushion the ground reaction forces acting during impact, thus protecting the musculoskeletal system of a wearer.

Generally speaking, at least a subset of the plastic strands 120 may comprise a foamed plastic material, for example foamed ethylene-vinyl-acetate (EVA) and/or foamed thermoplastic polyurethane (TPU). Other materials that may be used for at least a subset of the strands 120 include expanded polyamide (PA) and/or other materials suitable for being foamed which are known in the art. Such foamed materials are particularly well suited for absorbing the afore-mentioned ground reaction forces. Moreover, these materials may have the advantage that they may also be able to return a large part of the energy absorbed by the sole 100 during cushioning of the impact forces back to the foot of a wearer.

Furthermore, in the case of the sole 100 shown in FIG. 1a, the material of individual subsets of plastic strands 120 as well as their cross-section differs within the middle layer 141. More precisely, the middle layer 141 comprises a subset 121 of plastic strands 120 in the heel region, which each comprise a void 135 within their interior. Herein, the voids 135 extend essentially parallel to the plastic strands 120 in the subset 121. Such "ventilation channels" may, for example, help to save weight or they may influence the elasticity of the sole 100.

As can be gathered from FIG. 1a, the plastic strands 120 are furthermore arranged within the sole 100 in such a manner that the thickness of the sole 100 tapers off towards the tip of the foot. This may account for the fact that, in the forefoot region of the sole 100, a higher flexibility may be desirable for dynamic roll-off and push-off whereas in the heel region a higher degree of cushioning may be desirable.

FIGS. 1b-f show further possibilities of how the material, the cross-section, the arrangement, or the packing density of the plastic strands 120 may be varied between the different layers 140, 141 and 142 but also within individual layers 140, 141, 142, or how additional elements like, for example, reinforcing fibers 160 may be incorporated into or in between the plastic strands 120.

In each case, only a small section of the region 110 of the sole 100 is shown, as the main purpose here is to illustrate to the skilled person the different possible variations which remain within the scope of the present disclosure. The following statements therefore may generally apply to other embodiments.

Figure 1B:
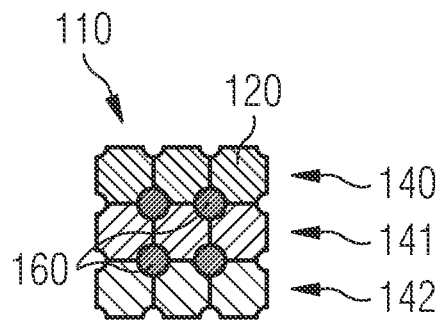

In FIG. 1b, all plastic strands 120 have approximately the same cross-section. In the case depicted in FIG. 1b, the cross-section of each plastic strand 120 is generally quadratic, but with slanted corners. Into the voids resulting from the slanted corners, a respective reinforcing fiber 160 has been incorporated during the extruding. The reinforcing fibers 160 extend, for example, essentially parallel to the plastic strands 120. It is also possible that such reinforcing fibers 160 are incorporated only between some plastic strands 120. The reinforcing fibers 160 may, for example, be metal wires or textile reinforcing fibers. The reinforcing fibers 160 may be arranged within the sole 100 in such a manner that they may act as a sole reinforcing element or at least form a part thereof. This may remove the requirement for the use of a separate sole reinforcing element and hence simplify the construction of the sole 100 and, thus, its manufacture. While it is not shown in the figures, it is also possible that a plurality of fibers is arranged within a single strand.

Figure 1C:
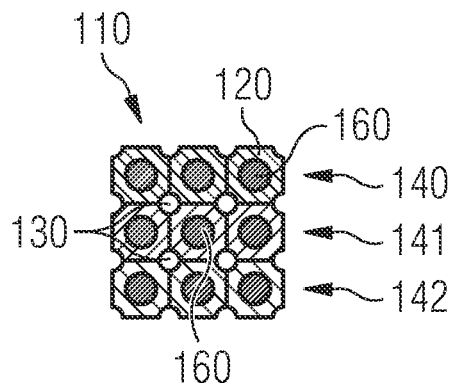

In FIG. 1c, the plastic strands 120 have the same cross-section as in FIG. 1b. However, in this case, the reinforcing fibers 160 are arranged within the plastic strands 120 and not in between them. The slanted corners of the plastic strands 120 therefore have the effect that between the plastic strands 120 voids 130 have formed, which may extend essentially parallel to the plastic strands 120.

Figure 1D:
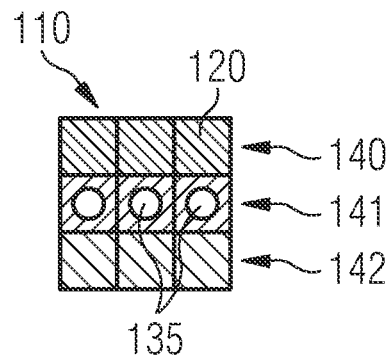

In FIG. 1d, on the other hand, the plastic strands 120 have an approximately rectangular cross-section, for example an approximately quadratic cross-section, without slanted corners. This may have the effect that the plastic strands 120 abut each other, such that there are no voids between the plastic strands 120. In this case, the plastic strands 120 of the middle layer 141 comprise voids 135 in their interior.

Figure 1E:
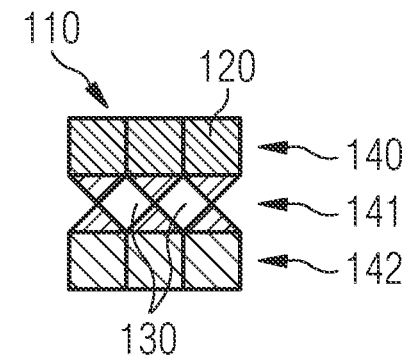
Figure 1F:
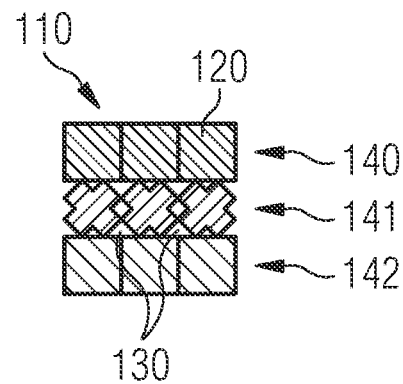

In the embodiments shown in FIGS. 1e-f, the plastic strands 120 of the middle layer 141 comprise a different cross-section than the plastic strands 120 of the top or bottom layer 140 and 142, respectively. The latter each have an approximately quadratic cross-section. In FIG. 1e, the plastic strands 120 of the middle layer 141 comprise, for example, an X-shaped cross-section. In FIG. 1f, the plastic strands 120 of the middle layer 141 comprise a cross-section in the form of a tilted, thick plus-sign ("+"). In both cases, the cross-section of the plastic strands 120 of the middle layer 141 has the effect of forming voids 130 in between them which extend essentially parallel to the plastic strands 120.

As already mentioned several times, variation of the cross-sectional shape of the plastic strands 120 is not limited to a specific layer of the sole 100, for example the layer 141. The same is true for a variation of the material of the plastic strands 120, the elasticity of the plastic strands 120, and so forth. In addition, a variation of the above-mentioned parameters directly within one or more of the individual layers 140, 141, 142 of the sole 100 is also possible.

For example, the following cross-sectional shapes may be considered for the plastic strands 120: round, oval, X-shaped or in the form of a plus-sign, rectangular, quadratic, trapezoid-shaped, parallelogram-shaped, T-shaped, double-T-shaped.

A suitable choice of the cross-sectional shape of the plastic strands 120 (and of the process parameters; more on this issue follows below) may therefore have the effect that the sole 100 comprises voids 130, 135 between and/or within at least a subset of the plastic strands 120, wherein the voids 130, 135 may extend at least in part essentially parallel to the plastic strands 120, as has been explained above with the help of multiple examples.

FIGS. 1g-h once again illustrate the effect that may be achieved by the construction of the region 110 of the sole 100 by essentially jointly extruded plastic strands 120. Each case shows, in a schematic manner, a setup for the measurement of the bending stiffness of the sole 100, or more precisely of the region 110, in what is called a 3-point-bending test. To this end, the region 110 of the sole 100 is put onto two bearings 180 in a predetermined manner and then loaded from above with a force 185 in the region between the two bearings 180, and the bending displacement of the sole 100 in the region 110 is measured as a function of the force 185.

Figure 1G:
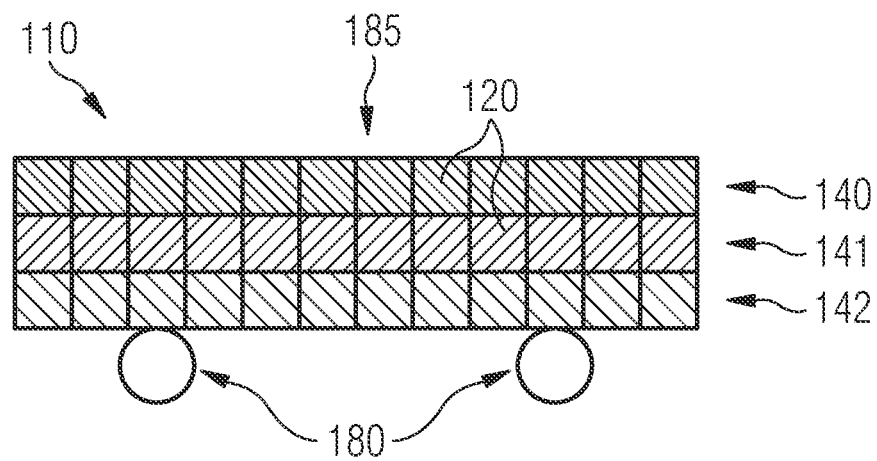
Figure 1H:
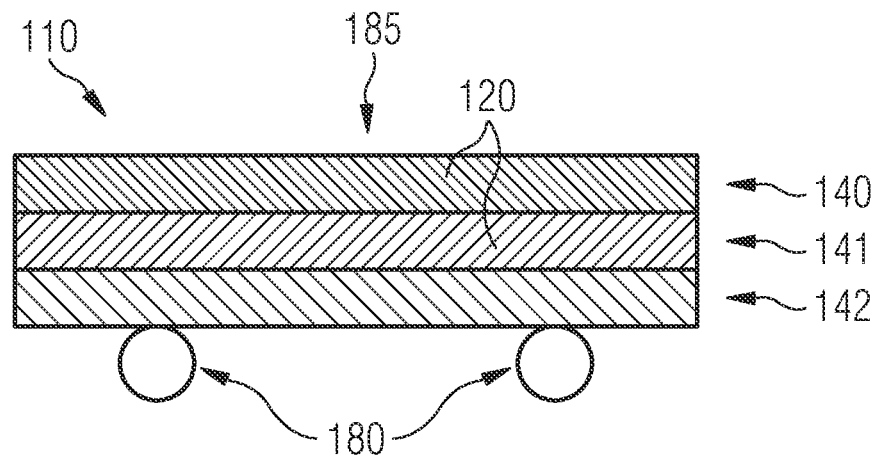

If the sole 100 is mounted in such a way that the individual plastic strands 120 in the region 110 extend parallel to the bearings 180 as shown in FIG. 1g (i.e., in FIG. 1g into the image plane), then a smaller bending stiffness (i.e. a larger bending displacement at a constant force) may result than for the case in which the sole 100 is mounted in the manner shown in FIG. 1h, such that the plastic strands 120 in the region 110 extend perpendicular to the bearings 180 (i.e., in FIG. 1h within the image plane) and therefore "bridge" the gap between the bearings 180.

The exact differences in the bending stiffness between the two orientations of the region 110 of the sole 100 during the 3-point-bending test will in general depend on a multitude of factors. For example, the cross-sectional shape of the plastic strands 120 as well as the degree to which a skin may have formed at the surface of each of the plastic strands 120 after extrusion (more on this follows below) may be of relevance.

FIGS. 2, 3a-c, 4, and 5 show possible embodiments of a manufacturing method 200 as well as apparatuses which may be considered for the method. In the illustrations of FIGS. 2, 3a-c, 4, and 5 it is, for simplicity, always assumed that the entire sole 100 to be manufactured consists of a single region 110 with essentially jointly extruded plastic strands 120. However, as previously mentioned, this need not always be the case. It is also possible that the region 110 with the plastic strands 120 merely constitutes a part of the sole 100. In such instance, further processing steps may potentially be necessary, and such steps would be conceivable to the skilled person based on the present disclosure. However, the following statements also remain applicable in this case.

In the embodiment of manufacturing method 200 shown in FIG. 2, the basic sequence of the method 200 is illustrated. The method 200 comprises an essentially jointly extruding of a plurality of plastic strands 120. The extruding may, for example, be performed through at least one die 220. To this end, the die 220 may comprise a plurality of orifices 225.

The orifices 225 may comprise different geometries, which may be reflected in different cross-sectional shapes of the plastic strands 120 being extruded through them. It is, for example, possible for the orifices 225 of the die 220 to comprise one or more of the following geometries: round, oval, X-shape, rectangular, quadratic, trapezoid-shape, parallelogram-shaped, T-shaped, double-T-shaped. In this context, it is possible for the geometries of the orifices 225 to differ from orifice to orifice or between different subsets of the orifices 225.

It may further be possible that all or at least a subset of the orifices 225 of the die 220 are opened and/or closed before and/or during the method 200. In this way, influence can be exerted on the geometry of the extruded sole blank 240 in a variety of ways. For example, the subset of the orifices 225 of the die 220 which are closed before and/or during the method 200 may be chosen in such a manner that the extruded sole blank 240 already approximately matches the final desired shape of the sole 100 in its three-dimensional shape. In this way, a laborious post-processing may be avoided. In the simplest case, the sole blank 240 is already the final sole 100. It is, in particular, possible for the closed orifices 225 to be chosen such that a cross-section through the plastic strands 120 that is oriented in a longitudinal direction (with regard to the finished sole 100), tapers off towards the tip of the foot, as already discussed in the context of FIG. 1a.

A plurality of materials may be considered as base materials 210 for the method 200. It is, in particular, possible that different base materials 210 or different material mixtures are fed to different orifices 225 of the die 220. In this way it is possible to use plastic strands 120 made from different materials 210 in a single sole 100.

It may, in particular, be possible that at least a subset of the plastic strands 120 comprises a foamed material after extrusion, for example, foamed ethylene-vinyl-acetate (EVA) and/or foamed thermoplastic polyurethane (TPU) and/or foamed polyamide (PA) and/or other plastic materials suitable for being foamed which are known in the art. In order to achieve such a foaming of the material of the plastic strands 120 after extrusion, the respective base material 210 may be provided with one or more blowing agents. Depending on the content of blowing agent in the base material 210, a stronger or weaker foaming after exiting the orifices 225 of the die 220 may be achieved. In addition, e.g., the extrusion pressure or the extrusion temperature may also have an influence on the degree of foaming.

The method 200 further comprises connecting 230 of the plurality of extruded plastic strands 120 to form the sole blank 240 or directly the sole 100. In the simplest case, this connecting 230 may happen "passively" without further assistance, for example, by the plastic strands 120 foaming to such a high degree after exiting the orifices 225 of the extrusion die 220 that they foam into one another and therefore form a connection between them "on their own."

However, it is also possible that the connecting 230 happens "actively." The extruded plastic strands 120 may, for example, be connected together by a suitable means. The connecting 230 may additionally at least partially be performed under the application of pressure. In this way it may be possible to increase the density of the produced sole 100. Moreover, in this way, the formation of voids within or between the individual plastic strands 120 may be decreased or avoided entirely.

The connecting 230 may also comprise supplying heat energy. Heat energy may, for example, be supplied in the form of steam and/or electromagnetic radiation. Through the feeding of heat energy, the surfaces of the extruded plastic strands 120 may, for example, be made "stickier" such that the individual plastic strands 120 better adhere to one another. By supplying heat energy, a skin which may potentially have formed at the surfaces of the plastic strands 120 after exiting the die 220 may also be melted or at least partially melted again. In this way, the anisotropy of the properties of the manufactured sole 100 may be influenced, for example, decreased.

In some embodiments, it is also possible that the plastic strands 120 are actively cooled down before and/or during the connecting 230. This may facilitate the formation of a skin at the surfaces of the plastic strands 120. Also in this manner, the anisotropy of the properties of the manufactured sole 100 may be influenced, for example, increased. This may also promote the formation of voids within and/or between the plastic strands 120.

That is, the method 200 and in particular the connecting 230 may proceed in such a manner that, after the connecting 230, voids are present between and/or within at least a subset of the plastic strands 120, wherein the voids preferably extend at least in parts essentially parallel to the plastic strands 120. This issue will be more thoroughly discussed again in the context of the discussion of FIG. 3a. In any case, it is conceivable to the skilled person how the above-mentioned possibilities influencing the connecting 230 may also influence the formation of such voids.

Moreover, the extruding and the connecting 230 of the plastic strands 120 may proceed in such a manner that they form multiple essentially parallel layers within the sole blank 240 or in the sole 100. In this context, the orifices 225 of the die 220 may be arranged in such a manner that these layers are arranged essentially horizontally within the finished sole 100. For example, by feeding different base material 210 to the different orifices 225 of the die 220, or through different geometries of the orifices 225 of the die 220, it may be achieved that at least some of the layers differ in a material of the plastic strands 120 and/or in a cross-section of the plastic strands 120. A variation of these parameters may also lead to a difference in the elasticity of the plastic strands 120. Moreover, a variation of these parameters from orifice 225 to orifice 225 or between arbitrary subsets of the orifices 225 is possible.

As an example, different base materials 210 may be fed to the orifices 225 in such a manner that after the extruding and connecting 230, one or more layers at the bottom side of the sole 100 will comprise a non-foamed material, while one or more layers at the top side of the sole 100 will comprise a material with a melting temperature in a range suitable for further processing.

Figure 3B:
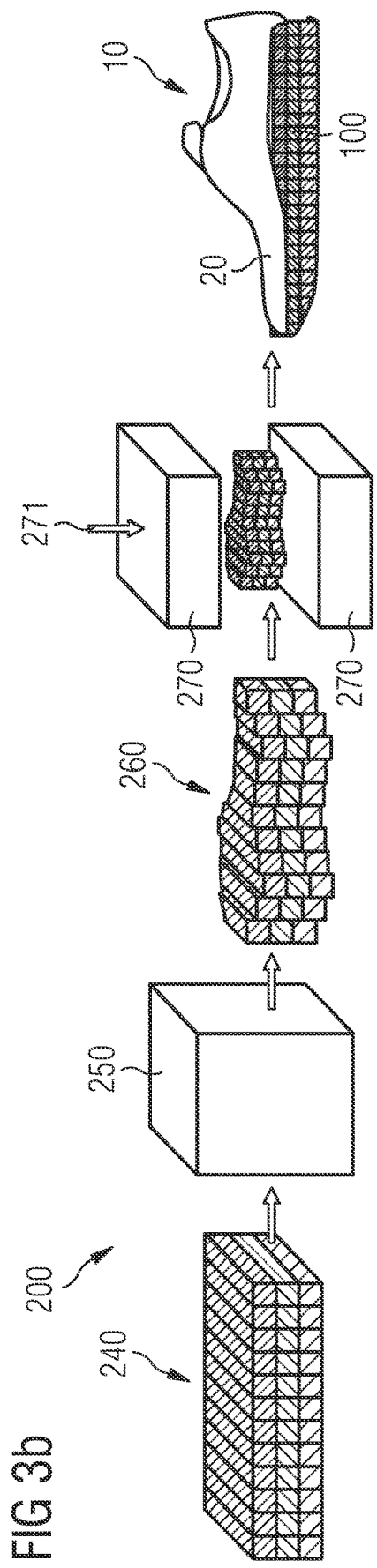
Figure 3C:
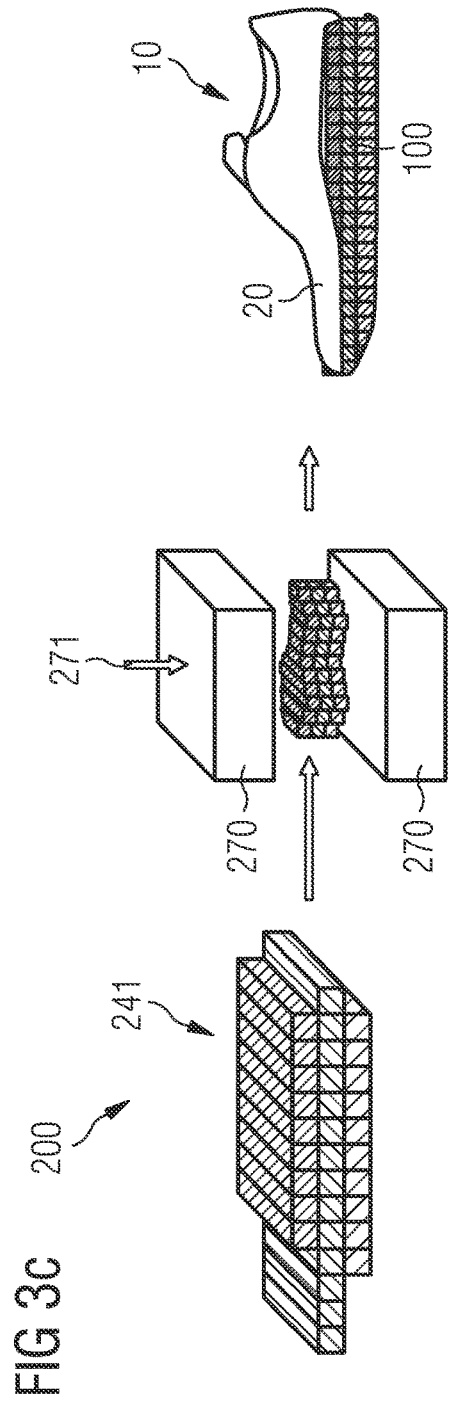

FIGS. 3*a-c* once again show possible embodiments of the method 200 with further technical details. However, the general statements made above in the context of the description of FIG. 2 remain analogously applicable in the following.

As can be seen in FIG. 3*a*, showing an embodiment of the method 200, one or more polymer base materials 210 are initially fed into a hopper and then into an extruder device 220, where they will be fed through a screw while being heated. A blowing agent may be added or activated. The molten polymer will then be forced through a die. The die comprises a plurality of orifices 225. From the orifices 225 of the die 220, a plurality of plastic strands 120 are essentially jointly extruded. The orifices 225 are arranged within the die 220 in such a manner that the plastic strands 120 form multiple essentially parallel layers 140, 141, and 142. In this context it is possible that different base materials 210 are fed to different orifices 225 and/or the orifices 225 may comprise different geometries. In the present case, different base materials 210 are fed to the orifices 225 in such a manner that the plastic strands 120 in each of the three layers 140, 141, and 142 shown here comprise different materials. As already mentioned several times, this is merely optional.

As indicated by the cross-section 221 through the plastic strands 120 immediately after exiting the die 220, the orifices 225 have in the present case a round cross-section and they are arranged in relation to each other in such a manner that the extruded plastic strands 120 still comprise large voids between them at this stage of the method 200.

Subsequently, connecting 230 of the plastic strands 120 occurs. This may comprise the application of pressure, supplying heat energy, or cooling down of the plastic strands 120, as previously mentioned. Additionally, during connecting 230 of the plastic strands 120, the cross-sectional shape of the plastic strands 120 may be changed and thus the shape and size of potential voids within and/or between the plastic strands 120 may be influenced. For example, the cross-sections 231 and 232 show potential results of connecting 230 the strands 120. For achieving the cross-section 231, the plastic strands 120 are strongly compressed during the connecting step 230, leading to a removal of the voids between the plastic strands 120 and a modification of their individual cross-section towards a quadratic cross-section. If only a small pressure is exerted during the connecting step 230, then, for example, the cross-section 232 may result. In this case, the voids between the plastic strands 120 may be reduced in comparison to the cross-section 221 before the connecting step 230; they have not, however, have been completely removed. In addition, the cross-sectional form of the individual plastic strands 120 is only flattened at the corners, such that the plastic strands now comprise an approximately quadratic cross-section with slanted corners instead of a round cross-section.

The degree to which the cross-sectional form and the packing density of the plastic strands 120 is changed during the connecting step 230 may, for example, depend on the exerted pressure, the amount of supplied heat energy and/or the degree of cooling of the plastic strands 120 before and/or during the connecting step 230.

Optionally, after the connecting step 230, a separation of a sole blank 240, 241 may occur if the method 200 comprises a continuous extrusion of the plastic strands 120.

The orifices 225 may be arranged within the die 220 or individual orifices 225 may be closed during the extruding in such a manner that the extruded and connected plastic strands already result in a three-dimensionally pre-shaped sole blank 241. If, on the other hand, all orifices 225 are opened during extrusion, a sole blank 240 in block form may result, necessitating a larger number of further processing steps in comparison to an already three-dimensionally pre-shaped sole blank 241.

As an example, such further processing of a sole blank 240 in block form is shown in FIG. 3*b*. For the manufacture of a finished sole 100 or a shoe 10, the manufacturing method 200 may further comprise a cutting step 250 of the sole 100 or the sole blank 240, respectively. From this, a cut sole blank 260 results, the dimension of which may already essentially match those of the final sole 100. In order to further process the three-dimensional shape of the cut sole blank 260, the sole 100 or the cut sole blank 260 may be further shaped in a molding tool 270, for example, under pressure as indicated by the arrow 271 and/or under the supply of heat.

In comparison, an exemplary further processing of an already three-dimensionally pre-shaped sole blank 241 is shown in FIG. 3*c*. Cutting of the already three-dimensionally pre-shaped sole blank 241 may either be completely omitted or it may be less complex and result in less waste than may be the case for a blank 240 in block form. In any case, also an already three-dimensionally pre-shaped sole blank 241 may be further shaped in a molding tool 270, for example under the application of pressure 271 and/or under the supply of heat.

In both cases, a sole 100 manufactured in this manner may then be connected with a shoe upper 20, for example, in order to obtain a finished shoe 10.

Figure 4:
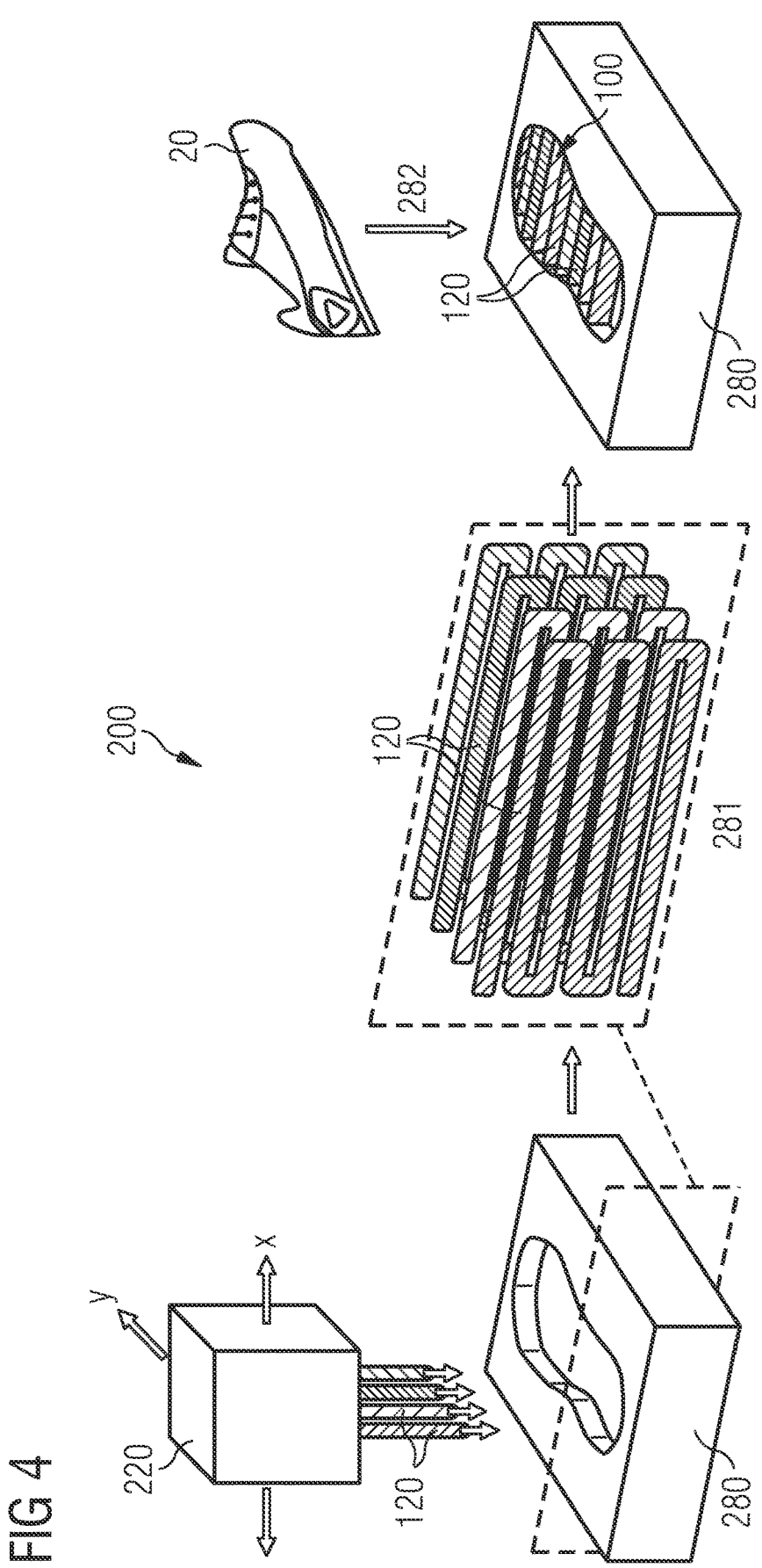
FIG. 4 shows a manufacturing method with a die that is movable above a mold, according to some embodiments.

FIG. 4 shows a further possible embodiment of a manufacturing method 200. A specific feature of the embodiment shown in FIG. 4 is that the orifices of the die 220 are arranged above a mold 280, which essentially corresponds to the shape of the sole 100 to be manufactured. The extrusion of the plastic strands 120 occurs directly into the mold 280, wherein the connecting of the plastic strands 120 may be provided for by gravity. This may have the effect that complex post processing steps may be omitted.

For example, to achieve an even filling of the mold 280 with the extruded plastic strands 120, the orifices of the die 220 may be moved above the mold 200 during the extruding. Herein, the die 220 may, for example, be moved within a plane parallel to the mold 280 (the xy-plane in FIG. 4). If the die 220 is, for example, moved back and forth in the x-direction during the extruding of the plastic strands 120, the extruded plastic strands 120 may be injected into the mold 280 in a fold-up manner as indicated in section 281.

After extruding the plastic strands 120 into the mold 280, one or more second elements, for example, a shoe upper 20, may be added. The shoe upper 20 may, in particular, be pressed onto the plastic strands 120 under pressure directly after the extrusion, as indicated by the arrow 282. On the one hand, this may result in a connection of the plastic strands 120 among each other. On the other hand, the "recently extruded" plastic strands 120 may still be sticky and adherent to such a degree that by pressing the shoe upper 20 onto them, the shoe upper connects to the plastic strands 120 directly without the addition of further bonding agents.

Figure 5:
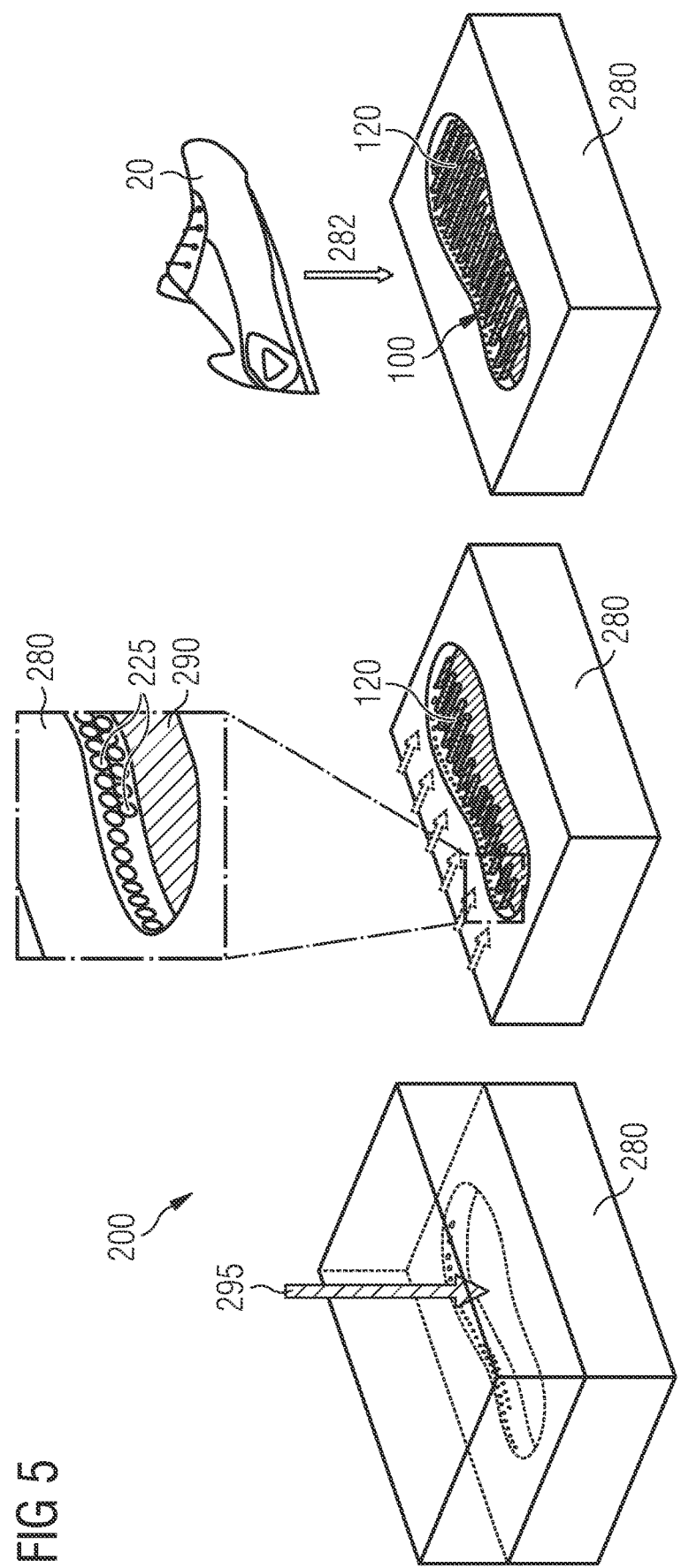
FIG. 5 shows a manufacturing method with a mold with a plurality of orifices in at least one sidewall, according to some embodiments.

FIG. 5 shows a further possible embodiment of a manufacturing method 200, wherein the orifices 225 of the die used for the extrusion of the plastic strands 120 are arranged in one or more sidewalls of the mold 280. In this embodiment, then, the plastic strands 120 are directly extruded or injected into the mold 280. This may save construction space and reduce soiling of the manufacturing apparatus. The connecting of the plastic strands 120 among each other may in this case be achieved by the plastic strands 120 being injected under pressure into the spatially bounded molding space of the mold 280 and by the plastic strands hence being at least partially pressed against each other or expanding in a direction towards each other.

Also in this embodiment, it is possible that after the injecting of the plastic strands 120, one or more second elements like, for example, a shoe upper 20 are added. It is, in particular, possible that directly after the extruding of the plastic strands 120, the shoe upper 20 is pressed onto the latter as indicated by the arrow 282.

In addition, it is also possible that prior to the extruding/injecting of the plastic strands 120, one or more first elements like, for example, an outsole 290 or a sole reinforcing element are injected into the mold 280, as indicated by the arrow 295. Alternatively, such first elements may also be manufactured separately and placed into the mold 280 before the extruding/injecting of the plastic strands 120. By means of the subsequent extruding/injecting of the plastic strands 120, such elements may be incorporated directly into the sole 100.

It is finally mentioned that several of the embodiments described herein, for example, the embodiments described in relation to FIGS. 4 and 5, may also be combined with one another within the scope of the present disclosure.

Further aspects of the present disclosure comprise embodiments of a manufacturing apparatus for performing such a manufacturing method 200, in particular a manufacturing apparatus comprising a mold 280 which comprises orifices in one or more of its sidewalls for the injecting of plastic strands 120.

What is claimed is:

1. A sole for a shoe, the sole comprising:
a sole blank comprising a plurality of jointly extruded plastic strands forming a first layer of jointly extruded plastic strands and a second layer of jointly extruded plastic strands,
wherein the jointly extruded plastic strands of the first layer extend parallel with respect to the jointly extruded plastic strands of the second layer,
wherein a first cross-section of the sole blank is compressed by a first application of pressure such that the first cross-section includes a continuous surface without any voids disposed between the plurality of jointly extruded plastic strands, and the plurality of jointly extruded plastic strands extend transverse with respect to the first cross-section of the sole blank,
wherein a second cross-section of the sole blank is compressed by a second application of pressure such that the second cross-section includes a porous surface comprising voids disposed between the plurality of jointly extruded plastic strands, and the plurality of jointly extruded plastic strands extend transverse with respect to the second cross-section of the sole blank.

2. The sole of claim 1, wherein a subset of the plurality of jointly extruded plastic strands does not extend in a longitudinal direction of the sole.

3. The sole of claim 2, wherein the subset of the plurality of jointly extruded plastic strands is aligned perpendicular to the longitudinal direction of the sole.

4. The sole of claim 1, wherein a subset of the plurality of jointly extruded plastic strands comprises a foamed plastic material.

5. The sole of claim 1, wherein the plurality of jointly extruded plastic strands are connected to each other by applying pressure.

6. The sole of claim 1, wherein the plurality of jointly extruded plastic strands are connected to each other by supplying heat energy.

7. The sole of claim 1, wherein the sole blank comprises voids between or within a subset of the plurality of jointly extruded plastic strands, wherein the voids extend essentially parallel to the plurality of jointly extruded plastic strands.

8. The sole of claim 1, wherein the first and second layers comprise different properties.

9. The sole of claim 8, wherein the jointly extruded plastic strands in the first and second layers differ in at least one of material composition, elasticity, and cross-section.

10. The sole of claim 1, wherein the first and second layers are horizontally arranged within the sole.

11. The sole of claim 1, further comprising a third layer at a bottom side of the sole comprising a non-foamed material.

12. The sole of claim 1, wherein the plurality of jointly extruded plastic strands each comprise a cross-section that is at least one of round, oval, X-shaped, rectangular, quadratic, trapezoid-shaped, parallelogram-shaped, T-shaped, and double-T-shaped.

13. The sole of claim 1, wherein the plurality of jointly extruded plastic strands are arranged within the sole in such a manner that a thickness of the sole tapers off towards a foremost tip of the sole.

14. The sole of claim 1, further comprising a sole reinforcing element.

15. The sole of claim 14, wherein the sole reinforcing element comprises one or more reinforcing fibers disposed within the sole blank.

16. A shoe comprising the sole of claim 1.

* * * * *

UNITED STATES PATENT AND TRADEMARK OFFICE
CERTIFICATE OF CORRECTION

PATENT NO. : 10,791,793 B2
APPLICATION NO. : 15/844175
DATED : October 6, 2020
INVENTOR(S) : Robertson et al.

Page 1 of 1

It is certified that error appears in the above-identified patent and that said Letters Patent is hereby corrected as shown below:

On the Title Page

Column 1, Item (73), in "Assignee", Line 1, delete "Herzongenaurach" and insert
-- Herzogenaurach --.

Signed and Sealed this
Fifth Day of January, 2021

Andrei Iancu
*Director of the United States Patent and Trademark Office*